United States Patent [19]
Cloup

[11] 3,937,241
[45] Feb. 10, 1976

[54] DEVICE FOR INJECTING AN ADJUVANT INTO A LIQUID

[76] Inventor: Philippe Cloup, 33360 Latresne, France

[22] Filed: Nov. 29, 1973

[21] Appl. No.: 420,318

[52] U.S. Cl. .................. 137/99; 91/224; 91/229; 417/403
[51] Int. Cl.² .................................. G05D 11/03
[58] Field of Search ............... 137/99; 91/224, 229; 417/403

[56] References Cited
UNITED STATES PATENTS

| 220,625 | 10/1879 | Knecht | 91/224 |
| 2,803,260 | 8/1957 | Wells | 137/99 |
| 3,094,938 | 6/1963 | Blomeke et al. | 417/403 |
| 3,135,279 | 6/1964 | Dunklee, Jr. | 137/99 |
| 3,818,924 | 6/1974 | Carlyle | 137/99 |

*Primary Examiner*—Robert G. Nilson
*Attorney, Agent, or Firm*—Stevens, Davis, Miller & Mosher

[57] ABSTRACT

A device for injecting adjuvant into a liquid employing a stepped piston in a stepped cylinder with a valve in the piston triggered to open and close at opposite ends of the piston travel to cause a reversal of piston movement while a further piston integral with the first mentioned piston operates to pump metered quantities of adjuvant into the stepped cylinder.

6 Claims, 2 Drawing Figures

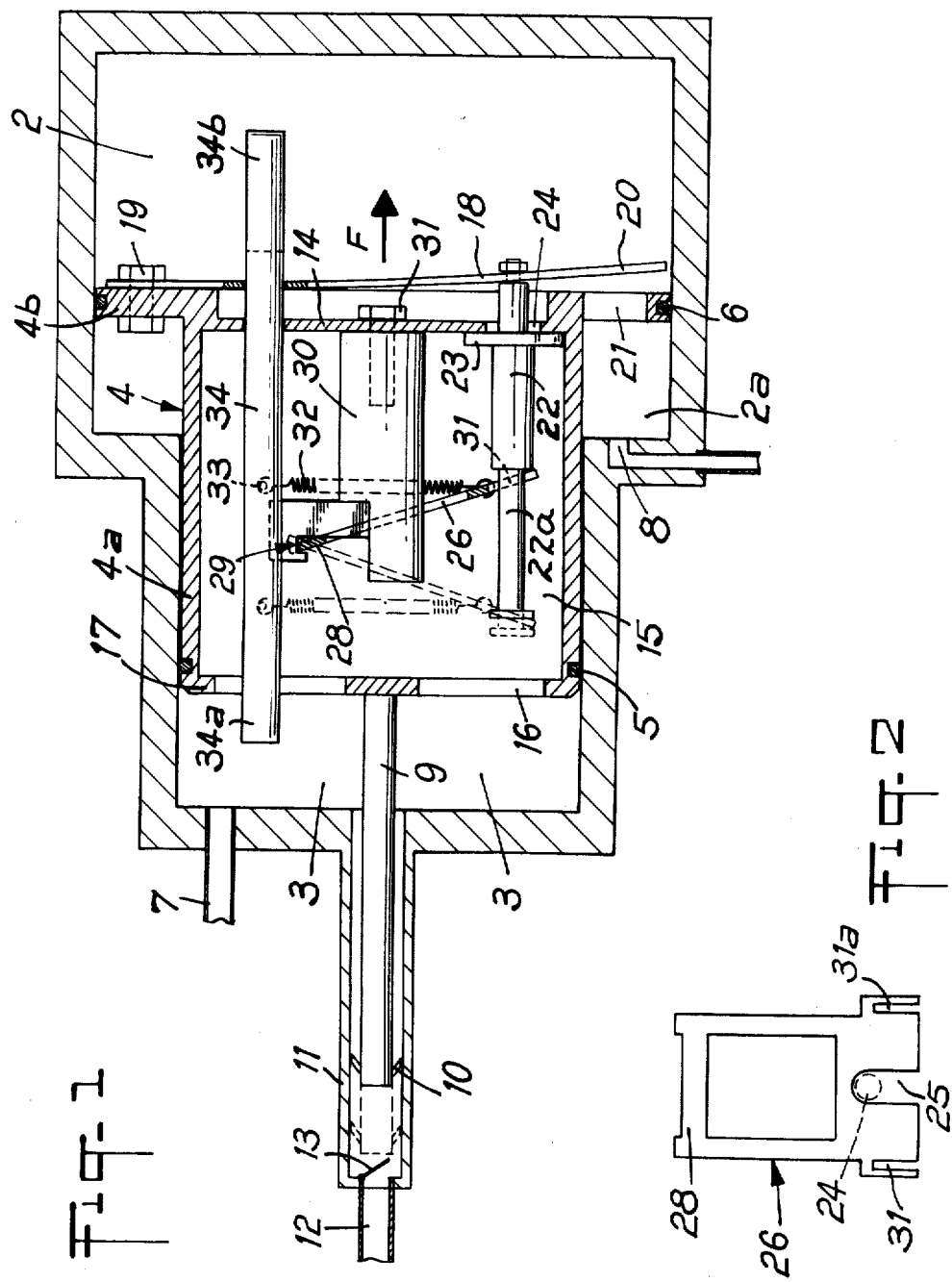

DEVICE FOR INJECTING AN ADJUVANT INTO A LIQUID

The present invention relates to a device for injecting an additive product or an adjuvant into a liquid.

The device according to the invention utilises the flow of a liquid to enable a specific quantity of an adjuvant to be injected into said liquid.

According to the invention there is provided a device for injecting an adjuvant into a liquid such device comprising a stepped piston slidingly mounted in a stepped body defining two cylinders of cross-sections corresponding to those of the two parts of the stepped piston, an inlet conduit into said body for liquid under pressure to control the displacement of said piston, means responsive to the movement of said piston for ensuring a specific flow of liquid from said body, and further means responsive to the movement of said stepped piston for controlling the introduction into said body of a specific quantity of an adjuvant to be mixed with said specific flow of liquid.

In order that the present invention may more readily be understood the following description is given, merely by way of example, reference being made to the accompanying drawing in which:

FIG. 1 is a view in longitudinal section of the injection device according to the invention;

FIG. 2 is a detail view of the fork of the device which controls the valves.

The device shown in FIG. 1 comprises a body 1 which defines a first cylinder 2 and a second cylinder 3 of cross-section smaller than that of cylinder 2. A stepped piston 4, is slidable in the body 1 with one part 4a of the piston slidingly mounted in the smaller section second cylinder 3 while the other part 4b of piston 4 is slidingly mounted in the first larger cross-section cylinder 2. The parts 4a and 4b of the piston 4 are provided with respective O-ring seals 5 and 6.

The cylinder 3 has an inlet orifice 7 for liquid under pressure while the second cylinder 2 has an outlet 8 for discharging liquid.

The stepped piston 4 has a further piston in the form of a plunger 9 provided at its free end with a conical seal 10 and sliding in a cylinder 11 intended to receive a liquid adjuvant which as the plunger 9 is withdrawn rightwardly, is sucked in via an orifice 12 provided with a flap valve 13 capable of being opened during the suction and closed during the advancing leftward stroke of the plunger 9 forcing the adjuvant of the cylinder 11 past the seal 10 into the cylinder 3.

The part 4a of the stepped piston 4 is hollow and has an end partition wall 14 which separates the two cylinders 2 and 3 from one another. The internal space 15 of the piston communicates with the cylinder 3 via openings 16 provided in the wall 17 at the opposite end of piston part 4a.

To the part 4b of the piston 4 there is attached, by means of a bolt 19, a flexible blade 18 having a free end 20 adapted to close an orifice 21 provided in the piston part 4b. The orifice 21 establishes the communication between the two faces of the piston part 4b when the blade 18 permits. The flexible blade 18 is connected to a rod 22 carrying a valve 23 capable of shutting an orifice 24 which orifice is provided in the partition wall 14 and connects the cylinder 3 to the cylinder 2.

The rod 22 is mounted for sliding relative to stepped piston 4 and has at its end remote from the valve 23, a reduced diameter portion 22a on which there is engaged a notch 25 of a fork 26 (FIGS. 1 and 2). The fork 26 is supported at the opposite side 28 in a notch 29 of a support member 30 secured to the partition wall 14 of the piston by a screw 31.

At either side of the fork 26 there are provided notches 31, 31a each of which there is engaged one end of a respective one of two springs 32 the other end of each spring being engaged on a spindle 33 integral with and extending transversely of a rod 34 slidingly mounted in the stepped piston 4 and capable of abutting with its ends 34a, 34b and the end walls of the cylinders 3 and 2 of body 1 in such a manner as to control the operation of the valves 23 and 20 in accordance with the travel of the stepped piston 4. The springs 32 thus form, with the spindle 33 and the fork 26, an over-centre mechanism biasing the fork 26 away from a vertical, central position.

The device illustrated operates in the following manner:

The stepped piston 4 and the plunger 9 arrive at the end of their travel in the position shown by broken lines on the rod 34 and the plunger 9 in FIG. 1, as the end 34a of the rod 34 contacts the left hand end wall of the cylinder 3 and causes the fork 26 to flip into the position shown in full lines in FIG. 1. In this position the fork will have caused the valve 23 to close and the end 20 of the blade 18 to open the orifice 21.

Liquid is then injected under pressure via the inlet 7 into the cylinder 3 to push the stepped piston 4 in the direction of the arrow F.

Because the valve 20 is open and is held open by the pressure of liquid in the cylinder 3 urging the valve 23 rightwardly, the liquid which is present between the piston part 4b and the end wall of the cylinder 2 can pass through the orifice 21 into the portion 2a of the cylinder 2 and can escape via the outlet duct 8.

During this travel of the stepped piston 4 the plunger 9 also moves in the direction of the arrow F so that it sucks in the adjuvant through the orifice 12 by lifting the valve 13 and fills the cylinder 11 with a specific volume of adjuvant. The end of the travel of piston 4, is signalled as the end 34b of the rod 34 comes into contact with the right hand end wall of the cylinder 3 to cause the fork 26 to flip over and to occupy the position shown in broken lines, in which the blade end 20 closes the orifice 21 and the valve 23 opens.

Consequently liquid under pressure coming in through the inlet duct 7 passes through the orifice 24 and through cut outs (not shown) in the blade 18 to fill the space between the bottom of the cylinder 2 and the piston part 4b. Since the piston part 4b has larger cross-section than the piston part 4a the equal liquid pressures to the left of partition wall 14 within piston part 4a and to the right of piston part 4b in the cylinder 2 gives rise to a differential force which is exerted on the stepped piston 4 in the direction opposite to the arrow F, i.e., leftwardly. During this return movement of the stepped piston 4, the adjuvant which is already present in the cylinder 11 is forced by the plunger 9 into the cylinder 3, by virtue both of the closing of valve 13 and of the conical form of the seal 10 which deforms so as to permit the adjuvant to pass.

The end of the return travel of the stepped piston 4 is signalled as the end 34a of the rod 34 comes into contact with the left hand end wall of the cylinder 3 and causes the fork 26 to flip over to open the valve at orifice 21 and close the valve 23.

The device has thus been brought back to the original position and a new cycle can begin.

The invention is, of course, not limited to the above described embodiment but it covers any variants falling within the scope of the following statement of claim, for example the valve 13 and its seat may be integral parts of the container in which the adjuvant is stored, and the end of the cylinder 11 may be adapted for being secured to this container.

I claim:

1. A device for injecting an adjuvant into a liquid, comprising a body having first and second cylinder portions of different cross-sections with end walls at the ends of the body, one end wall forming a closed end of the first cylinder portion and the opposite end wall forming a closed end of the second cylinder portion, a tubular member connected to said opposite end wall of the body having a bore which forms a chamber communicating with the space within said second cylinder portion, stepped piston means slidingly mounted in said body and having first and second piston portions of different cross-sections corresponding to those of the first and second cylinder portions respectively, a plunger connected to the piston means and slidably disposed in said bore, the cross-section of the plunger being less than the cross-section of the bore to provide for flow of fluid thereabout, means for introducing a first liquid under pressure into said body to one side of said piston means, an outlet conduit from said body, means for introducing a second liquid into said chamber comprising a conduit, a pressure responsive valve closing the conduit against flow of liquid from the chamber, a pressure responsive seal about the plunger which prevents flow of fluid around the plunger into the space within the second cylinder portion when the plunger moves with the piston means toward the space within the first cylinder portion and permits flow of fluid around the plunger as the plunger moves toward said pressure responsive valve, and means responsive to the position of said piston for controlling escape of a metered quantity of liquid and adjuvant through said outlet conduit.

2. An adjuvant injection device as set forth in claim 1 wherein said stepped piston means further includes a first valve on the first piston portion, said first piston portion having a larger cross-section than said second piston portion; and a second valve on the second piston portion; a triggering rod slidable relative to the stepped piston means and adapted to abut against said end walls of the cylinders at each end of the sliding travel of said stepped piston means; and rocking means actuated by said rod for controlling opening and closing of said valves alternatively.

3. An adjuvant injection device as set forth in claim 2, wherein said rocking means are comprised of a fork; a support member integral with said stepped piston means having one side in contact with the support member; a push rod operatively connected to the valves; said fork and two resilient members respectively secured between said sliding triggering rod and the side of said fork away from said one side.

4. An apparatus for mixing a first liquid with a second liquid comprising a housing enclosing a space having a first cylindrical chamber and a second cylindrical chamber of smaller cross-section than the first chamber, said housing having one end wall which forms a closed end of the first chamber and an opposite end wall which forms a closed end of said second chamber, a tubular member connected to said opposite end wall of the housing having a bore which forms a third chamber communicating with the second chamber, a piston having a hollow body portion slidably disposed in fluid tight relationship in said second chamber and having a flange at one end thereof slidably disposed in fluid tight relationship in said first chamber, a plunger attached to the piston and slidably disposed in said bore, the cross-section of the plunger being less than the cross-section of the bore to provide for flow of liquid thereabout, means for introducing a first liquid under pressure into the second chamber and to move the piston body into the first chamber, means for flow of liquid through the piston from the second chamber to the first chamber comprising an aperture, a valve for opening and closing said aperture, means for moving said valve responsive to movement of said piston whereby the valve is in its closed position when the piston body is disposed adjacent to the closed end of the second chamber, and is in its open position when the piston body has moved to extend partially in the first chamber, a first orifice for flow of liquid from the space enclosed by the housing disposed in the housing adjacent to the juncture between the first and second chambers, a second orifice disposed in said flange for flow of liquid from the first chamber through the flange into the first orifice, means responsive to the movement of said valve for opening said second orifice when the valve is closed and to close the second orifice when the valve is open, means for introducing a second liquid into said third chamber comprising a conduit, a pressure responsive valve closing the conduit against flow of liquid from the third chamber, and a pressure responsive seal about the plunger which prevents flow of fluid around the plunger into the second chamber when the plunger moves with the piston towards the first chamber and permits flow of fluid around the plunger as the plunger moves towards said pressure responsive valve.

5. The apparatus of claim 4 wherein the dimensions of the space enclosed by the housing, the movement of the piston, the dimensions of the tubular member and the length of the plunger are coordinated to provide a space between the plunger when moved its maximum distance from said pressure responsive valve for storing a metered amount of liquid, and the volume of space between the flange and said first orifice holds a metered volume of mixed liquids.

6. The apparatus of claim 5 wherein the valve for opening and closing said aperture in the piston comprises a valve body adapted to close the aperture, a first rod fixed to the valve body having an axis parallel with the axis of the piston, a second rod having its axis parallel with the axis of the first rod slidably disposed in the piston and extending outwardly at each end of the piston whereby the ends thereof strike said end walls of the housing when the piston moves from one position to another, a fork member having one end in contact with and pivotable relative to the second rod and the other end in contact with and pivotable relative to the first rod whereby movement of the second rod pivots the forked member and moves the first rod to open and close said aperture.

* * * * *